S. BABBITT & C. HOUSUM.
METHOD OF FORMING FLANGES ON PIPES.
APPLICATION FILED AUG. 24, 1911.
1,046,138. Patented Dec. 3, 1912.
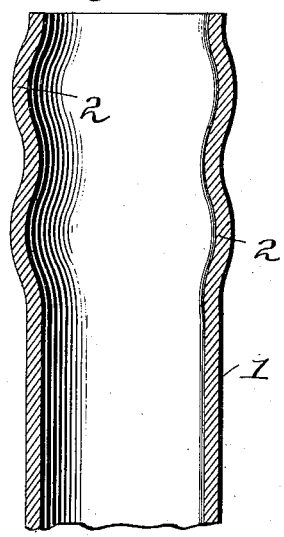
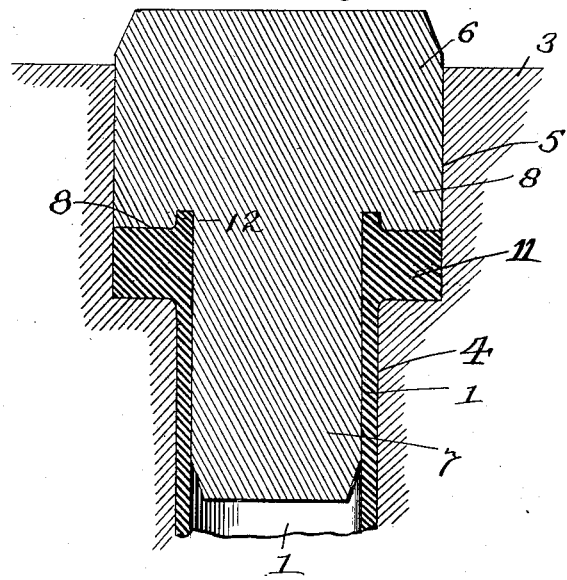
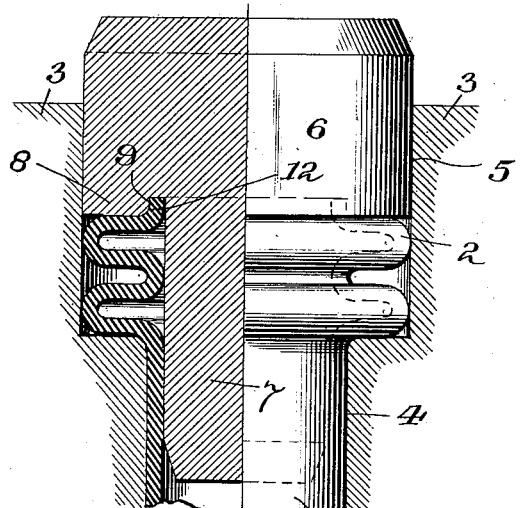
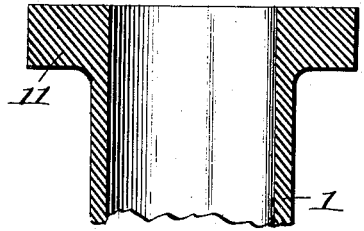
Seward Babbitt,
Chenoweth Housum,
INVENTORS

UNITED STATES PATENT OFFICE.

SEWARD BABBITT AND CHENOWETH HOUSUM, OF YOUNGSTOWN, OHIO.

METHOD OF FORMING FLANGES ON PIPES.

1,046,138.

Specification of Letters Patent. Patented Dec. 3, 1912.

Application filed August 24, 1911. Serial No. 645,764.

*To all whom it may concern:*

Be it known that we, SEWARD BABBITT and CHENOWETH HOUSUM, citizens of the United States, residing at Youngstown, in the county of Mahoning and State of Ohio, have invented certain new and useful Improvements in Methods of Forming Flanges on Pipes, of which the following is a specification.

This invention relates to a method or process of forming flanges and collars on pipes, the operation being characterized by a folding down and welding together of a portion of the metal of the pipe to secure sufficient metal to form flanges or collars thicker than the walls of the pipe itself.

The preferred manner of practising our invention will be described in connection with the accompanying drawing, in which:—

Figure 1 shows a pipe in axial section showing it as it appears after the first step in our process; Fig. 2 is an axial section, showing the manner in which the walls of the pipe fold upon themselves during the descent of the forming die plunger. Fig. 3 is a similar view after the action of the die and plunger is completed; and Fig. 4 shows a completed flange.

The pipe 1 is first corrugated or formed with lobes as illustrated in Fig. 1, the position of the lobes or corrugations 2 depending upon the desired location of the flange or collar. For a flange they are obviously adjacent the end of the pipe, as shown. The number and size of the corrugations are determined by the desired diameter and thickness of the flange, as will be apparent. The method of forming the corrugations is immaterial and for instance dies or rolls may be used for this purpose. The corrugated portion of the pipe is next heated to a welding heat and placed in a die 3 whose smaller bore 4 fits the pipe, and whose larger bore 5 corresponds to the desired diameter of the flange. Coacting with the die is a plunger 6 which fits the bore 5 of die, and has an extension 7 fitting the bore of the pipe. The shoulder 8 of the plunger 6 may have an annular groove 9 to receive the end of the pipe and form a lip or extension 12 beyond the flange on the completed flanged pipe, or this groove may be omitted altogether. The plunger is forced into the die under heavy pressure and first acts to fold the corrugations 2 upon each other, as indicated in Fig. 2 and then to force them together and cause them to weld into a solid flange 11, filling the die, as shown in Fig. 3. The pipe is then removed from the die and faced off as shown in Fig. 4, or machined to any other of the well known forms. As an alternative method we sometimes force the corrugations or folds 2 into contact before heating to a welding heat; afterward heating it to a welding temperature; again applying pressure to the die and completing the welding and formation of the flange. By obvious changes in the dies, collars may be formed at points intermediate the ends of the pipe as heretofore suggested.

The claims of the present application are not directed to any machines or tools for practising the process, and as these are subject to considerable variation, we desire to be understood to claim broadly the method defined in the appended claims regardless of the particular means of practising it.

The process may be performed with the ordinary tools used in heavy forging work, as will be apparent, or by a suitably organized machine designed solely for this special purpose.

Having thus described the invention, what we claim is:—

1. The process of forming flanges or collars on pipe which consists in folding portions of the walls of the pipe upon themselves and welding them together.

2. The process of forming collars or flanges upon pipe which consists in corrugating the walls of the pipe, then forcing the corrugations into intimate contact and welding them together.

3. The process of forming collars or flanges on pipe which consists in forming a lobe in the walls of the pipe, forcing the walls of the lobe into intimate contact and welding them together.

4. The process of forming collars or flanges on metal pipe which consists in corrugating a portion of the pipe, heating such portion of the pipe to a welding temperature forcing the corrugations into intimate contact, and finally pressing them to finished form and simultaneously welding them together in a die.

5. The process of forming collars or flanges on metal pipe which consists in corrugating a portion of the pipe, keeping the end portions at the normal diameter; then forcing the corrugations into intimate contact and welding them together.

6. The process of forming collars or flanges on metal pipe which consists in corrugating a portion of the pipe, keeping the end portions at the normal diameter; then forcing the corrugations into intimate contact, and finally while at a welding temperature pressing them to form in a die and simultaneously causing them to weld together.

In testimony whereof we have signed our names to this specification in the presence of two subscribing witnesses.

SEWARD BABBITT.
CHENOWETH HOUSUM.

Witnesses:
J. E. STAFFORD,
H. J. STAMBAUGH.